US011782385B2

United States Patent
Liu et al.

(10) Patent No.: US 11,782,385 B2
(45) Date of Patent: Oct. 10, 2023

(54) RECONSTRUCTION ALGORITHMS OF ELECTRON-BASED HOLOGRAMS

(71) Applicant: FEI Company, Hillsboro, OR (US)

(72) Inventors: Kun Liu, Portland, OR (US); Alan Bahm, Hillsboro, OR (US); Marcus Straw, Hillsboro, OR (US)

(73) Assignee: FEI Company, Hillsboro, OR (US)

( * ) Notice: Subject to any disclaimer, the term of this patent is extended or adjusted under 35 U.S.C. 154(b) by 52 days.

(21) Appl. No.: 16/717,760

(22) Filed: Dec. 17, 2019

(65) Prior Publication Data

US 2021/0181676 A1 Jun. 17, 2021

(51) Int. Cl.
*G03H 1/08* (2006.01)
*G03H 1/00* (2006.01)

(52) U.S. Cl.
CPC ......... *G03H 1/0866* (2013.01); *G03H 1/0808* (2013.01); *G03H 2001/0072* (2013.01); *G03H 2001/0816* (2013.01); *G03H 2001/0883* (2013.01)

(58) Field of Classification Search
CPC ............... G03H 1/0866; G03H 1/0808; G03H 2001/0072; G03H 2001/0816; G03H 2001/0883; G03H 1/0486; G03H 2001/0447; G03H 2001/0038; G03H 1/0443; G03H 5/00
See application file for complete search history.

(56) References Cited

U.S. PATENT DOCUMENTS

2001/0041296 A1* 11/2001 Herr .................. G03F 7/2049
430/1
2019/0287759 A1* 9/2019 Own .................. H01J 37/244

OTHER PUBLICATIONS

Brandt et al., "Multiphase Method for Automatic Alignment of Transmission Electron Microscope Images Using Markers", Journal of Structural Biology, Academic Press, vol. 133, No. 1, Jan. 1, 2001 (Jan. 1, 2001), pp. 10-22, XP008081038, DOI: 10.1006/JSBI.2001.4343.

(Continued)

*Primary Examiner* — Jade R Chwasz

(57) ABSTRACT

Apparatuses and methods for improved reconstructions of electron-based holograms are disclosed herein. An example method at least includes forming a hologram of a sample and a known object, forming a reconstruction of the known object using a reconstruction algorithm, comparing the reconstruction of the known object to a reference reconstruction of the known object, and adjusting the reconstruction algorithm based on the comparison of the reconstruction of the known object to the reference reconstruction of the known object. The example method may further include forming a reconstruction of the sample using the adjusted reconstruction algorithm.

18 Claims, 6 Drawing Sheets

(56) References Cited

OTHER PUBLICATIONS

EP20213660.2, Extended European Search Report, dated May 19, 2021, 9 pages.
Lichte Hannes: "Electron Holography" In: "Ultramicroscopy", May 23, 2012 (May 23, 2012), Elsevier, XP055801937, ISSN: 0304-3991, vol. 53, pp. 153-220, DOI: 10.1016/0304-3991 (94)90104-X, Retrieved from the Internet: URL: https://onlinelibrary.wiley.com/doi/pdfdirect/10.1002/9783527641864.ch5.
Tanigaki et al., "Three-dimensional reconstructions of electrostatic potential distributions with 1.5-nm resolution using off-axis electron holography", Journal of Electron Microscopy, vol. 61, No. 2, Jan. 1, 2012 (Jan. 1, 20121), pp. 77-84, XP055802120, DOI: 10.1093/jmicro/dfr097, Retrieved from the Internet: URL: https://www.researchgate.net/publication/51906934_Three-dimensional_reconstructions_of_electrostatic_potential_distributions_with_15-nm_resolution_using_off-axis_electron_holography.

\* cited by examiner

RECONSTRUCTION ALGORITHMS OF ELECTRON-BASED HOLOGRAMS

FIELD OF THE INVENTION

The invention relates generally to holography, and specifically to improved reconstructions based on fiducial-adjusted reconstruction algorithms.

BACKGROUND OF THE INVENTION

Holographic systems are gaining in attraction due to the potential resolution and the delicateness of the process. Electron-based holographic systems have the potential to provide insight into native state biomolecules, but may suffer from variable system parameters that negatively affect any resulting reconstructions. The variable system parameters of concern typically inject noise into the system that undesirably affects the holograms (data), which persists in the reconstructions (analysis). While attempts to account for the noise have been attempted, these attempts still have drawbacks. As such, there is a desire to account for such variables so that improved, more precise reconstructions are obtained.

SUMMARY

Apparatuses and methods for improved reconstructions of electron-based holograms are disclosed herein. An example method at least includes forming a hologram of a sample and a known object, forming a reconstruction of the known object using a reconstruction algorithm, comparing the reconstruction of the known object to a reference reconstruction of the known object, and adjusting the reconstruction algorithm based on the comparison of the reconstruction of the known object to the reference reconstruction of the known object. The example method may further include forming a reconstruction of the sample using the adjusted reconstruction algorithm.

An example apparatus at least includes an electron emitter coupled to provide an electron beam, a detector arranged to receive the electron beam after the electron beam interacts with a sample and a fiducial, and a controller coupled at least to the detector to receive holograms of the sample and fiducial acquired by the detector. Additionally, the controller at least includes code that, when executed, causes the controller to form a reconstruction of the fiducial using a reconstruction algorithm, compare the reconstruction of the fiducial to a known reconstruction of the fiducial; and adjust the reconstruction algorithm based on the comparison. The controller further includes code that, when executed, causes the controller to form a reconstruction of the sample using the adjusted reconstruction algorithm.

BRIEF DESCRIPTION OF THE DRAWINGS

Like reference numerals refer to corresponding parts throughout the several views of the drawings.

DETAILED DESCRIPTION OF EMBODIMENTS

Figure 1:
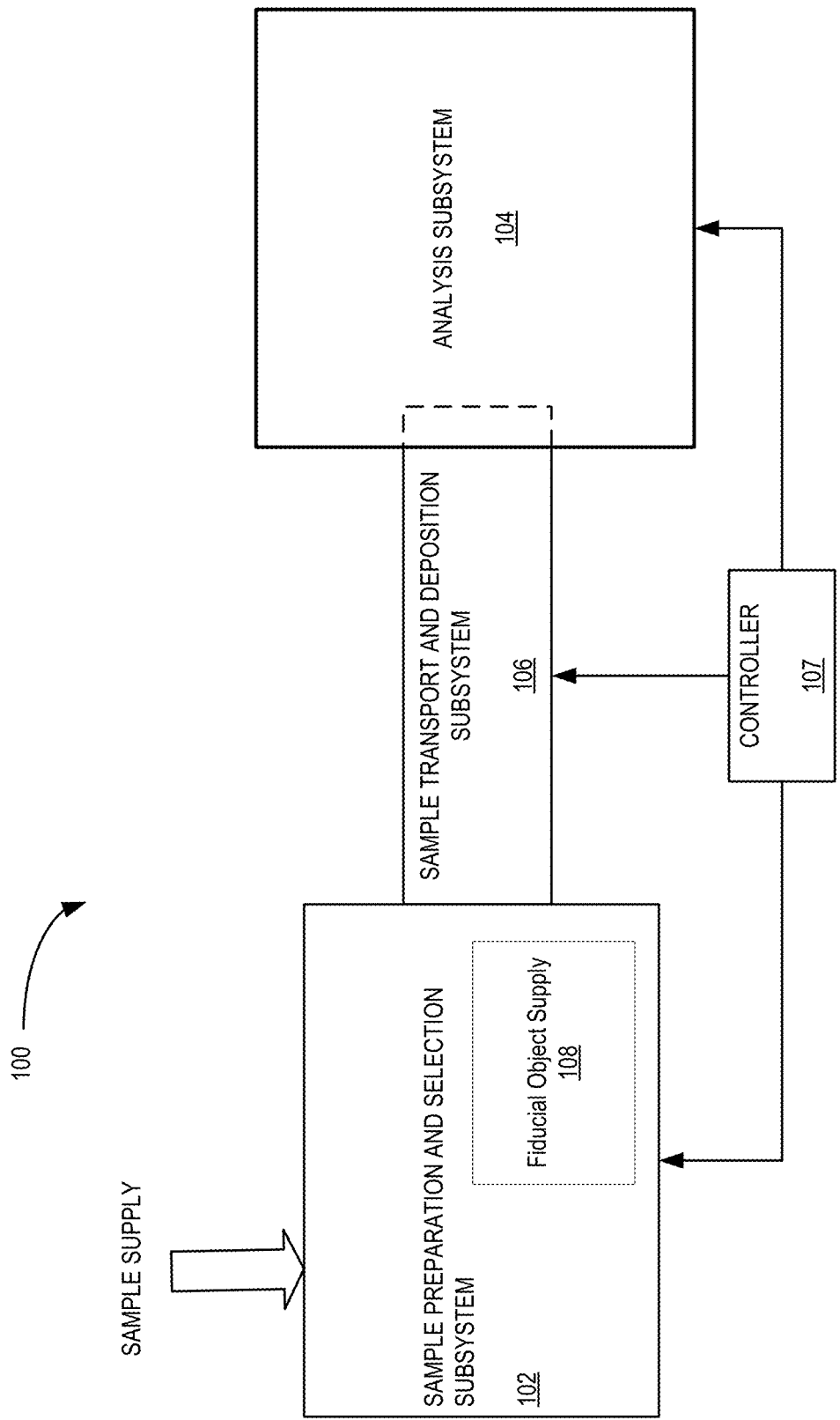
FIG. 1 is an example sample preparation and analysis system in accordance with an embodiment of the present disclosure.

Embodiments of the present invention are described below in the context of point projection inline holography, and more specifically aimed at providing more accurate reconstructions through the incorporation of fiducials in the holography process. For example, electron-based holography acquires a hologram of a calibration object along with a sample, and uses a reconstruction of the calibration object to adjust a reconstruction of the sample. The adjusted reconstruction then provides a more accurate reconstruction of the hologram. In general, the adjustments to the reconstruction algorithm account for variable system parameters that can affect the hologram, such as vibrational noise, magnification of the holography system, and coherency of the electron beam, to name a few.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatuses are referred to as "lowest", "best", "minimum," or the like. It will be appreciated that such descriptions are intended to indicate that a selection among many used functional alternatives can be made, and such selections need not be better, smaller, or otherwise preferable to other selections.

Electron hologram technology is gaining attention for use in 3D structure imaging and analysis of bio-molecules. Part of its attraction comes from its nondestructive nature and the atomic level resolutions (e.g., resolution ~0.35 nm) that can be obtained. In electron hologram technology, a (highly) coherent electron source emits coherent electron waves that travel in the space with a constant phase. However, after illuminating the coherent electron wave on a bio-molecule, such as a protein molecule with a size of 4-5 nm, the electron waves are scattered. The phases of the scattered electron wave are altered and carry structural information of the bio molecule being illuminated. The scattered electron wave continues to travel in space and interferes with non-scattered waves forming an interference pattern. The interference pattern is then detected and used to extract the structural information of the bio-molecule using mathematical reconstruction techniques.

The reconstruction process has been found to depend on many factors that could be hard to determine precisely, such as noise due to vibration, hologram magnification, reconstruction methodology, and the degree of coherency of the electron beam, to name a few. Any vibrations, especially in the nanometer range, may blur the hologram image and make it hard to reveal true information of the protein molecule being imaged. Additionally, the protein sample is only a few 100 nanometers away from the source, but around a few 10 millimeters away from the screen where it's hologram is taken, where the ratio of these two distances determines the magnification of the holography system. The magnification, i.e. the ratio of the distance between screen and protein molecule to the distance between the protein molecule and source, could vary, sometimes dramatically, if the protein-source distance has an uncertainty of a few tens of nanometers. Such variation in distance is possible, for example, due to flatness of a membrane holding the sample and stage location, the stage holding the membrane. These uncertain factors can distort the electron hologram and produce a non-authentic protein structure upon reconstruction.

One technique to at least address the above identified problems is to include a fiducial object with the sample material when obtaining the hologram. The fiducial may act like a scale bar and further assist with adjusting the reconstruction of the sample to account for the variables discussed above. In general, it is desirable that the fiducial object have a comparable size to the bio-molecule being investigated, but larger than the hologram resolution (e.g., a resolution around 0.35 nm), and the structure and size of the fiducial object should be known or can be measured. Additionally, it may be helpful to have known reconstructions of the fiducial available, but that is not necessary. Example fiducial objects include Bucky balls, e.g., C60, C84 and C180, having a uniform size above 1 nm, RNA or DNA molecules that have well defined geometry and structure, and gold-platinum nanoparticles with sizes from 2 to 20 nm. Simultaneously obtaining a hologram of the sample and the fiducial object, the hologram of the fiducial object can be used to adjust a reconstruction of the sample so that it is more accurate/complete. For example, values for system parameters related to vibration, magnification, electron beam coherency, etc., may be extracted from a reconstruction of the fiducial object by comparing a reconstruction of the fiducial object to its known size and structure. These extracted parameters can be applied to the reconstruction of the sample to obtain a more precise reconstruction of the sample. For example, the extracted parameters may be used to adjust initial conditions of the reconstruction algorithm used to form the reconstruction of the sample. In some embodiments, a contrast enhancement function may also be extracted and applied to the reconstruction of the sample, which is a function of the coherency of the electron beam. Alternatively or supplementally, the reconstruction of the fiducial may be adjusted to be more precise based on known structural information. The same adjustment may then be applied to the reconstruction of the sample to improve the sample reconstruction. In general, calibration parameters are created for the geometry, contrast, and scale with using the reconstruction of the fiducial object, which are then used to form a more precise reconstruction of the sample. As a result, more authentic structure and size information of the sample molecules may be achieved.

FIG. 1 is an example sample preparation and analysis system 100 in accordance with an embodiment of the present disclosure. System 100 is capable of preparing various samples for subsequent analysis, such as holography and associated reconstructions. While at least the analysis aspects of system 100 may be used on any desired sample types, the sample preparation and delivery aspects may be more applicable to soft sample types that tend to be delicate, e.g., biological materials. In some embodiments, the sample is a protein or biomolecule desired to be analyzed in a native-like state. In such an embodiment, the system 100 ionizes a protein, filters the desired protein from an ionized sample supply, transports the ionized protein to the analysis area where the protein is deposited on a substrate for analysis. The deposition may be performed to reduce or eliminate any damage to the sample material. In addition to the sample, a fiducial object may also be deposited along with the sample to assist in subsequent reconstructions, such as to assist in providing more accurate reconstructions. While the discussion uses biological materials as an example sample, other sample types are also within the scope of the present disclosure.

The system 100 may at least include a sample preparation and selection subsystem 102, a sample transport and deposition subsystem 106, an analysis subsystem 104, and a controller 107. While not shown, various vacuum pumps and power supplies may be coupled to at least some of the subsystems and components to provide a desired operating environment. In some embodiments, the three subsystems 102, 104 and 106 may form a monolithic sample preparation and analysis system for imaging a sample, where the monolithic system includes a continuous path from sample introduction to imaging/analysis. In other embodiments, however, the subsystems 102 and 106 may form a monolithic system for preparation and deliver of a sample to a substrate, which may then be delivered to an analytical tool of choice by any desirable means, such as a freestanding holographic system. Regardless of the embodiment, the holographic techniques discussed herein may be implemented to gain more detailed sample information over general holographic analysis.

Subsystem 102 performs various functions on an input sample supply to provide desired samples. In some embodiments, the sample is a protein, such as lysozyme, calmodulin, protein A/G, OmpF porin (an outer membrane protein of *Escherichia coli* (1)), monoclonal antibody immunoglobulin (IgG), C-reactive protein (CRP), streptavidin, and human serum albumin, to name a few. Of course, the prior list of proteins is included for examples and is not limiting to the disclosure. The various functions provided by subsystem 102 at least include ionization of the input sample supply, and filtering or selection of a target sample type from the sample supply. An example subsystem 102 may be a Thermo Scientific™ Q Exactive™ Mass Spectrometer. In some embodiments, the filtered, ionized sample may be kinetically cooled to reduce overall kinetic energy of the sample. After cooling, the sample is provided to subsystem 106. In embodiments where the sample is a protein, it may be desirable that the protein be in a desired native-like state after preparation and filtering, which may be validated in some embodiments. Of course, in other embodiments, the protein need not be in a desired native-like state and nor does the sample need to be a protein. The discussion of the sample being formed of proteins is only for system illustration purposes and is not intended to be limiting in any way.

Subsystem 102 may additionally include a fiducial object supply 108 for providing a fiducial object to the sample transport and deposition transport 106. The fiducial object supply 108 may include a supply of fiducial objects that are provided to subsystem 106 along with, before or after a sample is provided to the subsystem 106. Example fiducial objects include Bucky balls, such as C60, C84 and C180, RNA or DNA molecules, gold-platinum nanoparticles, to name a few. In general, any nano-sized object may be used as a fiducial object as long as a they satisfy a few requirements, such as having a comparable size to the sample (e.g., bio-molecule or protein being investigated) larger than hologram resolution (e.g., larger than 0.35 nm), and the structure and size of the nano-sized object should be known or be measured. If at least these characteristics are satisfied, then the nano-sized object should work as a fiducial object.

Subsystem 104 may comprise a direct imaging system, such as an in-line or reflective holographic imaging system, which includes at least an emitter, a sample holder, and a detector. The direct imaging system may include a charged particle beam emitter, e.g., electron emitter, or a light emitter, e.g., a laser. The detector may be a pixel-based, solid state detector or a micro-channel phase plate detector, but any detector compatible with the emitter is contemplated herein. In some embodiments, the sample may be placed between the emitter and the detector for in-line holography. In other embodiments, the emitter, sample and detector may be arranged for reflective holography. Of course, other arrangements are also contemplated herein and are within the scope of the present disclosure.

In some embodiments, subsystem 104 is a direct electron imaging system that generates electron interference images of a sample and a fiducial object. In such an embodiment, the electron interference images, e.g., holograms, may be used to form improved reconstructed images of the sample. Subsystem 104 generates holograms using a coherent electron beam generated by an emitter. The hologram or holograms include a hologram of the sample and the fiducial object, which will be the basis of subsequent reconstructions. In general, subsystem 104 is not limited by the other subsystems, and subsystems 102 and 106 can be used to select and deposit samples for any end analysis technique.

Subsystem 106 provides sample transportation and deposition processes for prepared samples and fiducial objects provided by subsystem 102. In some embodiments the sample may be ionized by subsystem 102, and in such embodiments subsystem 106 may include a plurality ion transport stages coupled together that terminate at a deposition location. The termination of the transport stages may include ion optics configured to slow the travel of the sample ions down so that they can be deposited on a substrate without damage, or at least with minimal damage. For example, in some embodiments, it may be desirable to deposit a protein at an energy that reduces or prevents the proteins from being denatured for subsequent analysis. Preferably, ion energy does not exceed 30 eV/charge or more preferably 10 eV/charge at deposition.

Additionally or alternatively, some embodiments of system 100 may not have subsystem 102 coupled to subsystem 104 via subsystem 106. In such embodiments, the sample may be transported by a user from subsystem 106 to subsystem 104, by hand for example. For example, an ionized protein sample and a fiducial object is deposited onto a substrate that is then removed from subsystem 106 before inserted into subsystem 104. In some embodiments, the substrate of subsystem 106 is located in an analytical position. In such an embodiment, the sample is deposited onto the substrate and is ready for analysis in that location. In other embodiments, however, the substrate is translated from a deposition position to an analytical position.

Controller 107 is coupled to the other subsystems of system 100 to control and/or initiate their individual and choreographed operation. The controller 107 may be one or more processing cores or microcontrollers and associated memory and storage for storing executable code. In addition to controlling the operation of system 100, controller 107 may also process data generated by analysis subsystem 104. Of course, the processing of this data may alternatively or additionally be performed by off-line computers. The processing of the data may include generating reconstructed images from one or more holograms acquired by subsystem 104, and/or the analysis of a reconstruction of the fiducial object to improve the reconstruction of the sample. Improving the reconstruction of the sample based on the fiducial reconstruction provides a more accurate reconstruction of the sample, for example. Of course, controller 107 may simply control system 100 and the reconstruction processes may be performed on a separate computing platform, such as a cloud-based system.

In operation, a sample supply is provided to subsystem 102. The sample supply, which may be in solid or liquid form, includes a target protein along with other carrier substances and/or impurities, for example. Subsystem 102 may initially ionize the sample supply to prepare for filtering, such as by electro-spray ionization. Filtering may then be performed to extract the target protein from the sample supply. For example, the target protein may be filtered using mass to charge ratio techniques, such as by a mass spectrometer. Once the ionized protein has been prepared, the ionized protein is kinetically cooled then transported to a substrate via subsystem 106. Additionally, a fiducial object is provided to subsystem 106 by fiducial object supply 108. In some embodiments, both the ionized protein and the fiducial object are provided to subsystem 106 simultaneously so that they are deposited together to ensure close proximity. In other embodiments, the fiducial object can be provided to and deposited by subsystem 106 before or after the protein is deposited. Alternatively, the fiducial object may be part of a substrate the protein is deposited. In general, the protein being investigated is desirably deposited in close proximity to the fiducial object so that holograms of both may be simultaneously acquired.

After deposition, one or more holograms of the sample protein and the fiducial object may be formed by subsystem 104. Once at least one hologram that includes both the protein sample and the fiducial object is obtained, either the controller 107 or a coupled computing platform may form a reconstruction of the fiducial object, for example using a reconstruction algorithm. Subsequently, the reconstruction of the fiducial object is compared to a known reconstruction of the fiducial object or to a known size and structural definition of the fiducial object. The comparison provides difference information, such as relative structure differences and size differences, that can be used to change/update the reconstruction of the fiducial and/or the reconstruction algorithm. For example, initial conditions of the reconstruction algorithm may be changed for subsequent use. Once the reconstruction algorithm is updated, it is used to form a reconstruction of the sample protein. Due to using a updated reconstruction algorithm, the reconstruction of the sample protein is more accurate. For another example, an amount of blur due to system vibration may be determined due to the comparison, which may then be used to deblur a reconstruction of the sample. In essence, the fiducial object is used as a scale bare for vibration subtraction, magnification differences and/or coherency of the electron beam so that the variations in these aspects of system 100 are accounted for in the reconstruction process.

Figure 2:
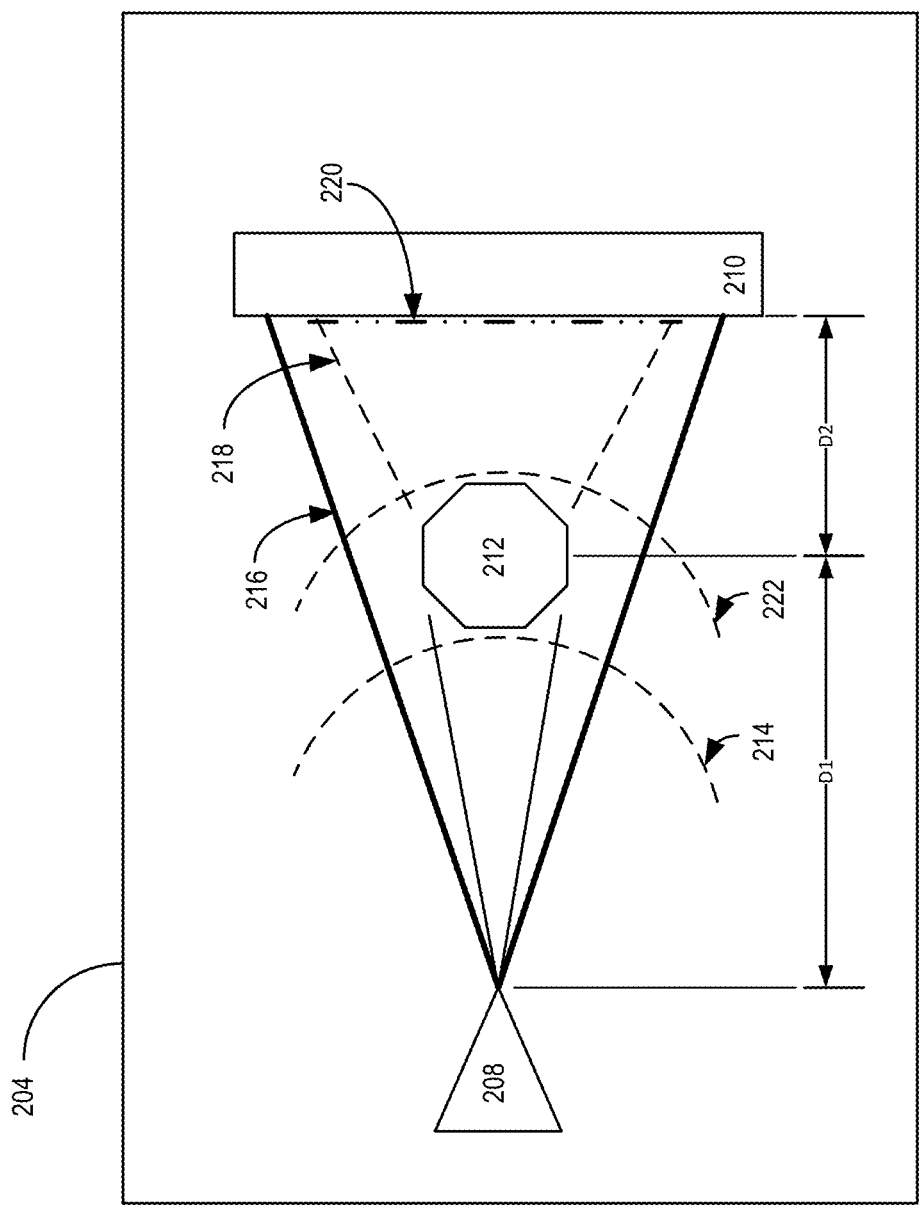
FIG. 2 is an example data-gathering subsystem for acquiring holograms of samples in accordance with an embodiment of the present disclosure.

FIG. 2 is an example data-gathering subsystem 204 for acquiring holograms of samples and/or fiducials in accordance with an embodiment of the present disclosure. Analysis subsystem 204, just one example of analysis subsystem 104, may be used to obtain holograms of a sample and/or a fiducial so that a subsequent reconstruction of the sample may be improved. The analysis subsystem 204 may account for at least some of the undesirable system characteristics that the disclosed technique corrects. For example, the magnification of subsystem 204 (e.g., D2/D1) may vary due to physical characteristics of a substrate holding the sample and fiducial that affect the magnification. Additionally, any vibrational noise subsystem 204 experiences during acquisition of a hologram may affect the reconstruction, along with the degree of coherence of the electron source. All of these variables may be accounted for and reduced or eliminated based on the disclosed technique.

Subsystem 204 at least includes an emitter 208 and a detector 210. A sample 212, which is held by an electron transparent substrate, may be located between the emitter 208 and the detector 210 for the formation of a hologram 220 on a surface of the detector. Such arrangement forms an in line holography system, but other arrangements are covered by the disclosure. Emitter 208 may be any type of emitter desired, such as a charged particle emitter (e.g., electrons or ions), or a photon-based emitter (e.g., laser). In some embodiments, emitter 208 is an electron emitter able to provide coherent electron beams having energies from 50 to 500 eV. It should be noted that the emitter while desirably coherent will have some incoherency (e.g., $\Delta E$) that results in an electron beam having a range of energies. This range of energies can affect the resulting holograms and associated reconstructions. Regardless of emitter type, an illumination wave front 214 propagates toward sample 212. When the wave front 214 reaches sample 212, elastic and inelastic interactions occur with the sample, e.g., with the components that form the sample, resulting in exit wave 222 leaving the sample 212. Exit wave 222 includes undiffracted wave 216 and diffracted wave 218. The undiffracted and diffracted waves 216 and 218 form an interference pattern that is detected at the detector 210 resulting in hologram 220.

The magnification of subsystem 204 is determined by the ratio of two distances. The two distances include the distance between the emitter and the sample, identified as D1 in FIG. 2, and the distance between the sample and the detector, identified as D2 in FIG. 2. It should be noted that the illustration of FIG. 2 is not to scale and D2 may typically be much larger than D1, and the relative relation of the components of FIG. 2 are not proportionate and are for illustrative purposes only. The magnification is defined by the ratio of D2 to D1, e.g., D2/D1. Subsystem 204 may have a D1 in the hundreds of nanometer range, e.g., 400 nm, and a D2 in the tens of millimeter range, e.g., 70 mm. Although this may lead to a relatively large magnification of the sample and the fiducial, even small changes in D1 can have an unaccounted for effect on the magnification and ultimately any resulting reconstructions. Such small changes in D1 may occur due to unevenness of the substrate holding the sample and fiducial. The unevenness and/or lack of planarity of the substrate results in small changes of D1 across the substrate, which may result in differences in D1 for different portions of the sample and/or fiducial. Due to the potential resolution of electron holography, on the order of 0.5 Å for example, even a deviation of a couple of nanometers across the substrate may affect the accuracy of a resulting reconstruction. As such, changes in magnification may be accounted for using the disclosed technique, e.g., adjusting the reconstruction algorithm based on a comparison of the fiducial reconstruction to a known reconstruction of the fiducial object.

Figure 3:
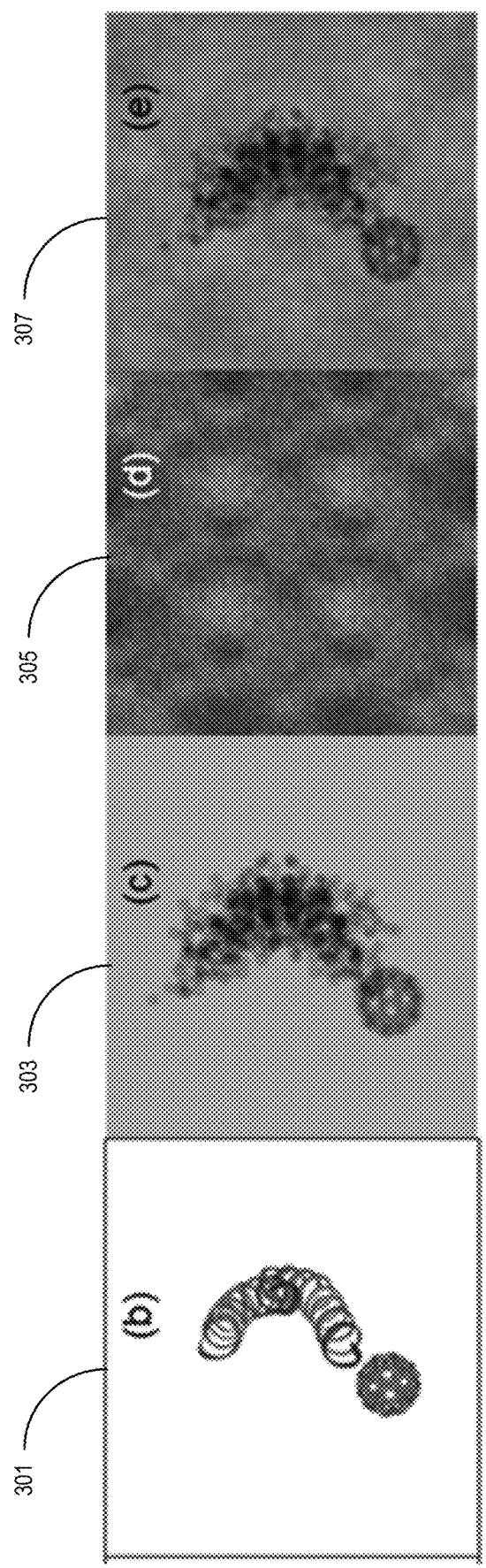
FIG. 3 includes example images.

FIG. 3 includes example images 301 through 307. The images show a sequence of fiducial and sample examples of the holography process. For example, image 301 shows C60 and a subset of an alpha helices structure from the protein database (5HKR) that will be imaged in a holography system, then reconstructed. Image 303 shows a simulation of an exit wave (e.g., exit wave 222) leaving the subset of the protein and the fiducial of image 301, and image 305 is a simulation of a resulting hologram based on the exit wave of image 303. The simulated hologram was simulated using a 250 eV coherent electron beam with the objects (i.e., C60 and subset of the protein) placed 300 nm from the electron source (e.g., D1) with the detector placed 70 mm from the objects (e.g., D2). Lastly, image 307 illustrates a numerical reconstruction of the subset protein exit wave and fiducial object C60. It should be noted that fiducial is identifiable in the reconstruction of the exit wave, which may serve as a scale bar for the protein and may further allow for determination and correction for other system parameters that adversely affect the reconstruction, e.g., system vibration noise, magnification uncertainty, and degree of coherence, or lack thereof, of the electron beam.

Figure 4:
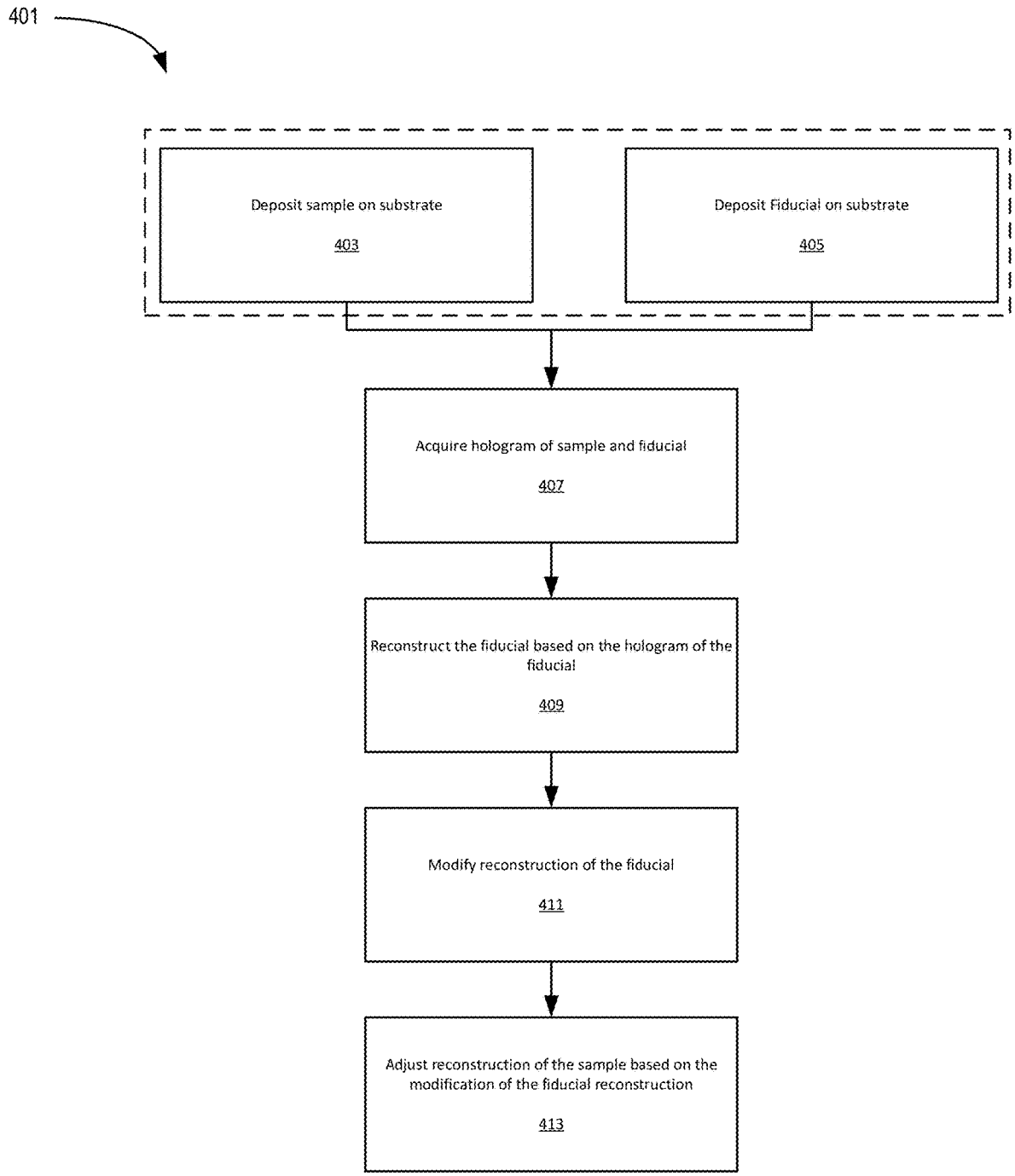
FIG. 4 is an example method for obtaining a reconstruction of a fiducial so that a more accurate reconstruction of a sample is obtained in accordance with an embodiment of the present disclosure.

FIG. 4 is an example method 401 for obtaining a reconstruction of a fiducial so that a more accurate reconstruction of a sample is obtained in accordance with an embodiment of the present disclosure. The method 401 may be implemented by a holography system, such as system 100, or by any computing system coupled to receive holograms from a holography system. In general, the method 401 obtains a hologram of a fiducial object with a known reconstruction and/or structural layout and dimensions and uses the reconstruction of the fiducial object to adjust the reconstruction of a sample. The fiducial object may be acting as a scale bar that is able to adjust the reconstruction to account for variable system parameters of the holography system used to acquire the holograms of the fiducial object and the sample.

The method 401 may begin with process block 403, which includes depositing a sample on a substrate. The substrate configured for direct electron imaging of the sample, which allows for formation of an interference pattern, e.g., hologram, of the sample. The deposition method may be any known method to arrange the sample on the substrate.

Method 401 may alternatively begin with process block 405, which includes depositing a fiducial object on the substrate. The deposition of the fiducial object may be by the same means as for the sample. In some embodiments, process block 403 and 405 are combined so that the sample and fiducial object are deposited together. Alternatively, the fiducial object may be part of the substrate. In general, it is desirable that the sample and fiducial object are deposited in close proximity so that the hologram of the sample and the hologram of the fiducial object are acquired simultaneously. The simultaneous acquisition of the respective holograms is so that the system parameters that affect the precision of the ensuing reconstruction, such as magnification of the holography system, vibration noise, coherence of the imaging beam, etc., are accounted for.

Process blocks 403/405 may be followed by process block 407, which includes acquiring holograms of the sample and the fiducial object. The acquisition of the holograms may include exposure of the sample and fiducial object by a (coherent) electron beam and detection of resulting interference patterns of the sample and the fiducial object.

Process block 407 may be followed by process block 409, which includes forming a reconstruction of the fiducial object based on the hologram of the fiducial object. The reconstruction may be generated using any known reconstruction algorithm, and the reconstruction algorithm isn't limiting to the present disclosure.

Process block 409 may be followed by process block 411, which includes modifying the reconstruction of the fiducial object. The modification includes comparing the reconstruction to known reconstructions or structural information of the fiducial object. The comparison can account for the above-referenced system parameters that affected the fiducial reconstruction, which may then lead to accounting for and removing them from the sample reconstruction. Any differences highlighted by the comparison are characterized for use in process block 413, which includes adjusting the reconstruction of the sample based on the modification of the fiducial object reconstruction. The adjustment of the reconstruction based on the differences between the reconstruction of the fiducial to known reconstruction of the fiducial at least adjusts the reconstruction for the variable system parameters and subsequently provides a more accurate reconstruction of the sample.

Figure 5:
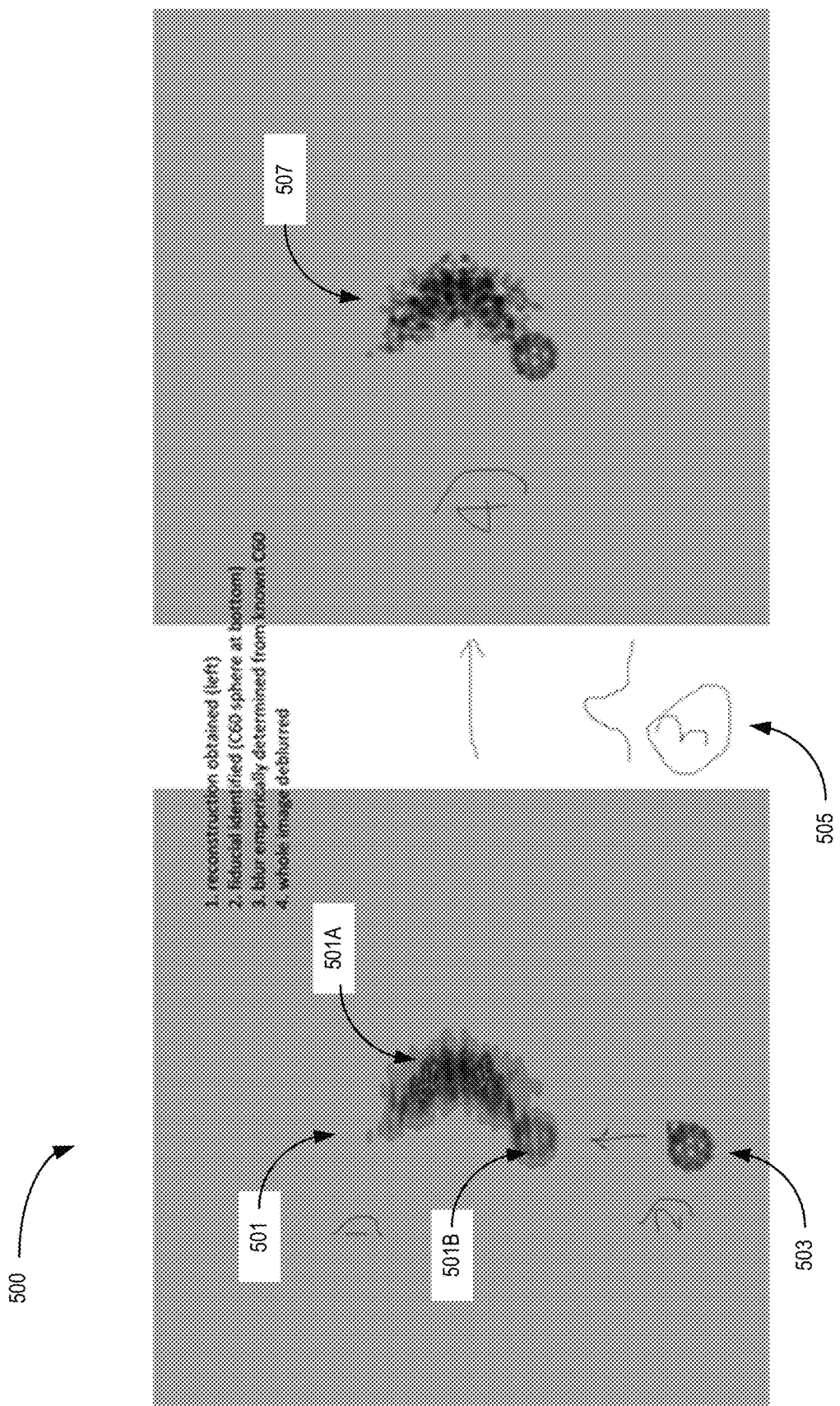
FIG. 5 is an example image sequence in accordance with an embodiment of the present disclosure.

FIG. 5 is an example image sequence 500 in accordance with an embodiment of the present disclosure. Image sequence 500 includes an initial blurry reconstruction of a sample and a fiducial (image 501), a known reconstruction of the fiducial (image 503), a deblur function (image 505), and a adjusted reconstruction of the sample (image 507). By comparing the fiducial reconstruction in image 501 to the known fiducial reconstruction in image 503, an amount of blur, for example, may be determined, which may then be used to deblur the sample reconstruction as shown in image 507.

Image 501 shows a blurry reconstruction of both a sample (501A) and a fiducial object (501B). The blurriness may be do to system vibrations occurring during hologram acquisition of the sample and fiducial object. As can be seen, the reconstruction of the sample is lacking in detail due to the blur, but the fiducial object, even though it is blurry, is clearly identifiable as a C60 sphere, for example.

The known reconstruction of the fiducial, e.g., the C60, is shown in image 503, which is then used to modify the reconstruction of the fiducial shown in image 501. This modification may be a simple deblur algorithm as shown in image 505, but can also include changes to correct for electron beam incoherencies, non-planarity of sample substrate, etc. Image 507 then shows the adjusted reconstruction of the sample based on the comparison of the fiducial reconstructions.

Figure 6:
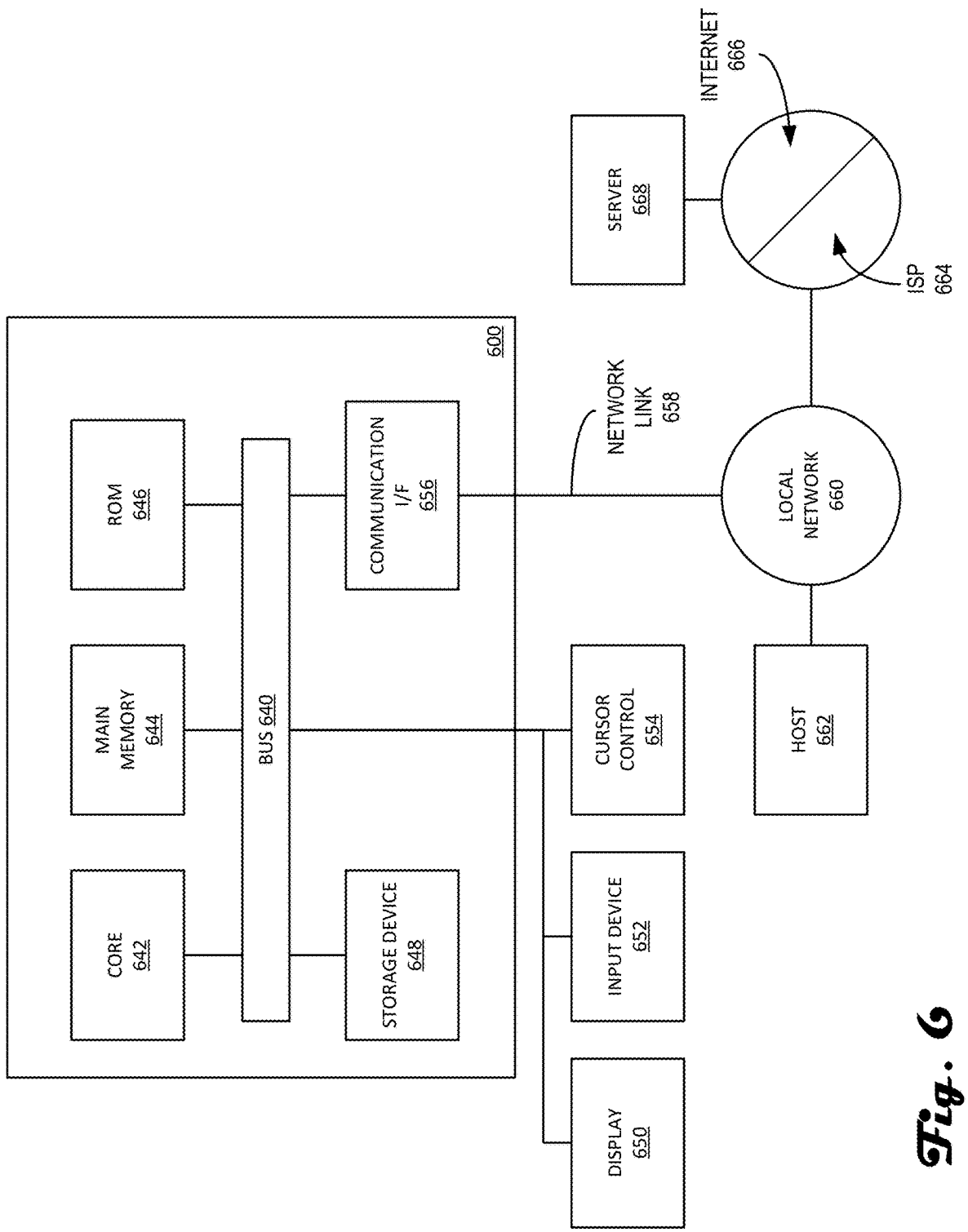
FIG. 6 is an example functional block diagram in accordance with an embodiment of the present disclosure.

FIG. 6 is an example functional block diagram 600 in accordance with an embodiment of the present disclosure. FIG. 6 is a block diagram that illustrates a computer system 600 that an embodiment of the invention may include. The computing system 600 may be an example of computing hardware included with system 100, such controller 107, subsystems 102, 104, 106, and/or coupled servers (not shown). Computer system 600 at least includes a bus 640 or other communication mechanism for communicating information, and a hardware processor 642 coupled with bus 640 for processing information. Hardware processor 642 may be, for example, a general purpose microprocessor. The computing system 600 may be used to implement the methods and techniques disclosed herein, such as methods 301 and 401, and may also be used to obtain images and segment said images with one or more classes.

Computer system 600 also includes a main memory 644, such as a random access memory (RAM) or other dynamic storage device, coupled to bus 640 for storing information and instructions to be executed by processor 642. Main memory 644 also may be used for storing temporary variables or other intermediate information during execution of instructions to be executed by processor 642. Such instructions, when stored in non-transitory storage media accessible to processor 642, render computer system 600 into a special-purpose machine that is customized to perform the operations specified in the instructions.

Computer system 600 further includes a read only memory (ROM) 646 or other static storage device coupled to bus 640 for storing static information and instructions for processor 642. A storage device 648, such as a magnetic disk or optical disk, is provided and coupled to bus 640 for storing information and instructions.

Computer system 600 may be coupled via bus 640 to a display 650, such as a cathode ray tube (CRT), for displaying information to a computer user. An input device 652, including alphanumeric and other keys, is coupled to bus 640 for communicating information and command selections to processor 642. Another type of user input device is cursor control 654, such as a mouse, a trackball, or cursor direction keys for communicating direction information and command selections to processor 642 and for controlling cursor movement on display 650. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 642 executing one or more sequences of one or more instructions contained in main memory 644. Such instructions may be read into main memory 644 from another storage medium, such as storage device 648. Execution of the sequences of instructions contained in main memory 644 causes processor 642 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 648. Volatile media includes dynamic memory, such as main memory 644. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 640. Transmission media can also take the form of acoustic or light waves, such as those generated during radio-wave and infra-red data communications.

Various forms of media may be involved in carrying one or more sequences of one or more instructions to processor 642 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 640. Bus 640 carries the data to main memory 644, from which processor 642 retrieves and executes the instructions. The instructions received by main memory 644 may optionally be stored on storage device 648 either before or after execution by processor 642.

Computer system 600 also includes a communication interface 656 coupled to bus 640. Communication interface 656 provides a two-way data communication coupling to a network link 658 that is connected to a local network 660. For example, communication interface 656 may be an integrated services digital network (ISDN) card, cable modem, satellite modem, or a modem to provide a data communication connection to a corresponding type of telephone line. As another example, communication interface 656 may be a local area network (LAN) card to provide a data communication connection to a compatible LAN. Wireless links may also be implemented. In any such implementation, communication interface 656 sends and receives electrical, electromagnetic or optical signals that carry digital data streams representing various types of information.

Network link 658 typically provides data communication through one or more networks to other data devices. For example, network link 658 may provide a connection through local network 660 to a host computer 662 or to data equipment operated by an Internet Service Provider (ISP) 664. ISP 664 in turn provides data communication services through the world wide packet data communication network now commonly referred to as the "Internet" 666. Local network 660 and Internet 666 both use electrical, electromagnetic or optical signals that carry digital data streams. The signals through the various networks and the signals on network link 658 and through communication interface 656, which carry the digital data to and from computer system 600, are example forms of transmission media.

Computer system 600 can send messages and receive data, including program code, through the network(s), network link 658 and communication interface 656. In the Internet example, a server 668 might transmit a requested code for an application program through Internet 666, ISP 664, local network 660 and communication interface 656.

The received code may be executed by processor 642 as it is received, and/or stored in storage device 648, or other non-volatile storage for later execution.

The embodiments discussed herein to illustrate the disclosed techniques should not be considered limiting and only provide examples of implementation. Those skilled in the art will understand the other myriad ways of how the disclosed techniques may be implemented, which are contemplated herein and are within the bounds of the disclosure. For example, the techniques disclosed herein can be applied to laser-based holography and/or non in-line holographic techniques.

What is claimed is:

1. A method comprising:
   forming, with an electron beam, a hologram of a sample and a known object, wherein the known object is of a comparable size of the sample;
   forming a reconstruction of the known object using a reconstruction algorithm;
   comparing the reconstruction of the known object to a reference reconstruction of the known object; and
   adjusting a reconstruction of the sample based on the comparison of the reconstruction of the known object to the reference reconstruction of the known object, wherein the known object is a Bucky Ball, an RNA molecule, or a DNA molecule.

2. The method of claim 1, wherein the known object is at least the size of the hologram resolution, is of comparable size to the sample, and has a known or determinable size and structure.

3. The method of claim 1, wherein forming a hologram of a sample and a known object includes:
   imaging the sample and the known object with an electron beam.

4. The method of claim 1, wherein the adjustment of the reconstruction algorithm corrects for system parameters that can vary and affect reconstructions.

5. The method of claim 4, wherein the system parameters include vibrational noise, hologram magnification, and electron beam coherence.

6. The method of claim 5, wherein adjusting the reconstruction algorithm for electron beam coherence affects contrast of reconstructions.

7. The method of claim 1, further including:
   depositing the sample on a substrate; and
   depositing the known object on the substrate.

8. The method of claim 7, wherein the sample and known object are deposited together.

9. The method of claim 1, further including providing an electron beam having an energy in a range from 50 to 500 eV.

10. The method of claim 1, wherein the known object further has a structure and size that is known or measurable.

11. An apparatus comprising:
    an electron emitter coupled to provide an electron beam;
    a detector arranged to receive the electron beam after the electron beam interacts with a sample and a fiducial, wherein the fiducial is a Bucky Ball, an RNA molecule, or a DNA molecule; and
    a controller coupled at least to the detector to receive holograms of the sample and fiducial acquired by the detector, the controller including code that, when executed, causes the controller to:
    form a reconstruction of the fiducial using a reconstruction algorithm;
    compare the reconstruction of the fiducial to a known reconstruction of the fiducial; and adjust a reconstruction of the sample based on the comparison.

12. The apparatus of claim 11, wherein the fiducial is at least the size of the hologram resolution, is of comparable size to the sample, and has a known or determinable size and structure.

13. The apparatus of claim 11, wherein the adjustment of the reconstruction of the sample corrects for system parameters that can vary and affect reconstructions.

14. The apparatus of claim 13, wherein the system parameters include vibrational noise, hologram magnification, and electron beam coherence.

15. The apparatus of claim 13, wherein adjusting the reconstruction algorithm for electron beam coherence affects contrast of reconstructions.

16. The apparatus of claim 11, wherein the sample is a biological sample.

17. The apparatus of claim 11, wherein the electron beam has an energy in a range from 50 to 500 eV.

18. The apparatus of claim 11, wherein the known object further has a structure and size that is known or measurable.

\* \* \* \* \*